United States Patent
Lohberg et al.

(10) Patent No.: US 7,123,002 B2
(45) Date of Patent: Oct. 17, 2006

(54) SYSTEM FOR TRANSMITTING THE POSITION OF A CONTROL ELEMENT

(75) Inventors: Peter Lohberg, Friedrichsdorf (DE); Wolfgang Fey, Niedernhausen (DE); Mario Engelmann, Steinbach/Ts. (DE); Klaus Rink, Rodenbach (DE); Tobias Beckmann, Eschborn (DE)

(73) Assignee: Continental Teves AG & Co. ohG, Frankfurt (DE)

( * ) Notice: Subject to any disclaimer, the term of this patent is extended or adjusted under 35 U.S.C. 154(b) by 0 days.

(21) Appl. No.: 11/083,510

(22) Filed: Mar. 18, 2005

(65) Prior Publication Data

US 2005/0162159 A1 Jul. 28, 2005

Related U.S. Application Data

(62) Division of application No. 10/343,260, filed on Jan. 28, 2003, now Pat. No. 6,897,648.

(51) Int. Cl.
G01R 33/02 (2006.01)
G01R 33/00 (2006.01)
G01B 7/14 (2006.01)

(52) U.S. Cl. .................... 324/207.11; 324/244

(58) Field of Classification Search ........... 324/207.11, 324/207.13, 244
See application file for complete search history.

(56) References Cited

U.S. PATENT DOCUMENTS 4,604,575 A * 8/1986 Shimizu et al. ........ 324/207.18
5,365,787 A * 11/1994 Hernandez et al. ........... 73/660
5,650,779 A    7/1997 Sugden
5,668,331 A    9/1997 Schintag et al.
6,242,908 B1 * 6/2001 Scheller et al. .......... 324/207.2

FOREIGN PATENT DOCUMENTS

| CH | 680475   | 8/1992  |
|----|----------|---------|
| DE | 3638493  | 5/1988  |
| DE | 3937572  | 5/1991  |
| DE | 19520299 | 12/1996 |
| DE | 19724388 | 12/1998 |
| DE | 19732764 | 2/1999  |
| DE | 19829126 | 5/1999  |
| DE | 19853451 | 5/2000  |
| WO | 0010848  | 3/2000  |

OTHER PUBLICATIONS

PCT/EP01/08751-Search Report.

* cited by examiner

Primary Examiner—Bot LeDynh (57) ABSTRACT

The present invention relates to a system for reliably transmitting the position of a control element to an electronic processing unit by way of electric signal lines, wherein the position signal is transmitted by way of several signal channels, and use thereof in a motor vehicle brake system. The present invention further describes a position transmitter for transmitting position signals with a magnetic encoder which is displaceable by a control element in relation to a magnetic transformer, wherein the magnetic transformer(s) along with an integrated electronic signal-conditioning circuit are arranged in an electronic sensor subassembly, as well as a receiving device for receiving a position signal comprising several processing channels for processing the position signals of the position transmitter.

8 Claims, 5 Drawing Sheets

SYSTEM FOR TRANSMITTING THE POSITION OF A CONTROL ELEMENT

RELATED APPLICATION

The present application is a divisional patent application of U.S. Ser. No. 10/343,260 filed on Jan. 28, 2003, now U.S. Pat. No. 6,897,648.

TECHNICAL FIELD

The present invention generally relates to sensing systems and more particularly relates to a system for reliably transmitting the position of a control element to an electronic processing unit.

BACKGROUND OF THE INVENTION

In the majority of cases, modern motor vehicles are equipped with brake systems in which the brake pedal pressure is transmitted to the brake cylinders—mostly boosted by a brake booster—by way of hydraulic lines. In motor vehicles of the next generation, the motion signal of the brake signal generator, upon the driver's request for braking, will not be transmitted exclusively hydraulically to a (hydraulic or electric) brake control device but by means of electric lines (these systems are commonly known as brake-by-wire systems). In addition to an electric signal transmission in the electro-hydraulic brake (EHB), a hydraulic line may be provided in addition to the electric line between the brake pedal and the brake control device for an emergency operation.

Very high demands are placed on the reliability of operation of a motor vehicle brake system. This also requires from the electronic acquisition of the position of a brake signal generator to be as accurate and reliable as possible.

An electronic system for acquiring the position of a brake signal generator must also exhibit a low consumption of rest current to prevent the usually limited energy capacity of an energy accumulator in the motor vehicle from being excessively stressed. Further, a corresponding system is required to permit being activated quickly and reliably when a request for braking pressure occurs due to movement of the brake signal generator, or when other outside events such as starting of the engine lead to conclude that a braking pressure request is imminent.

Systems for transmitting a brake signal are known in the art wherein potentiometers are used to sense the absolute position of the brake pedal and the position signal is transmitted to a processing unit in an analog manner. These systems suffer, among others, from the shortcoming that they are especially susceptible to disturbances. Further, the transmitted position signals are not sufficiently precise or permanently available, respectively, due to the hysteresis and wear of the potentiometer contacts.

Still further, active systems for travel measurement are known apart from the above-described passive systems, the said active systems being considerably more sophisticated in terms of circuit technology and, consequently, exhibiting a rest current consumption which is too high for continuous service.

BRIEF SUMMARY OF THE INVENTION

In view of the above, the present invention discloses a system which is improved compared to prior art systems for transmitting a brake signal.

The present invention relates to a system for reliably transmitting the position of a control element to an electronic processing unit, wherein the processing unit is integrated in particular into a brake control device (ECU), by way of electric signal lines, with the position signal being transmitted, preferably in a coded form, by way of several signal channels.

The system of the present invention includes two or more channels to enhance the reliability of operation. The system is designed with three channels in a particularly favorable manner. To render the channels largely independent, suitably, also the voltage supply means associated with the channels are configured independently. Reliability is considerably enhanced by a redundant design of important system functions.

The signals are transmitted by way of electric signal lines subdivided into several signal channels. The term 'electric signal lines' refers to electric lines and also to wireless, per se known means for transmitting electric signals, such as modern bus systems according to the blue-tooth-technology, etc. The said term also comprises signal lines transmitting the signals optically, e.g. by way of fiberglass.

In a preferred aspect, at least one signal channel has a lower position resolution than the other signal channel(s). The channel with the lower position resolution may this way be operated permanently with low power consumption.

In the system according to the present invention, preferably the signals transmitted by way of the signal lines are generated by means of a position transmitter described hereinbelow. A receiving device that will also be described in the following will then receive the signals produced by the position transmitter.

Preferably, the system is configured so that it may adopt different operation conditions. The operating conditions differ from one another by a different amount of energy consumption. In a particularly favorable manner, the operating conditions are distinguished by a different clock rate of a filter element at the input of the receiving circuit.

The system is equipped with a wake-up function in a preferred embodiment of the invention. Activation of the system or of parts of the system many either be effected by a reliable wake-up signal in the first channel, such as a square-wave pulse from the position transmitter, or by other events such as ignition, central locking mechanism, door opener, etc. The system adopts a state of low energy consumption before it receives a wake-up signal. Only individual or all functional groups of a first channel are active or restrictedly active in this state. In the state with low energy consumption these functional groups include wake-up elements enabling individual or all functional groups of further channels to be set to a state with higher energy consumption, where especially the full functionality of the overall device is achieved. The wake-up function enables the continuous operation of the circuit arrangement in a sleep mode with low energy consumption with a simultaneous activation ability (wake-up) of further channels with a comparatively higher resolution. In addition, the demanded redundancy of the system is made available in the activated operation. It may be especially expedient to equip the channel with the wake-up function with a wake-up element of two-stage action wherein after receipt of any optional signal a first stage in the circuit of the wake-up element is initially activated and performs a preliminary check with respect to an allowable wake-up signal. The said provision may e.g. be a simple comparator circuit that compares the signal level with an admissible threshold voltage and enables the second stage as soon as said threshold is exceeded.

In the second stage of the wake-up element another check of the received signal with greater accuracy is performed, for example, by means of a digital filter. Another example for a two-stage circuit arrangement for a wake-up action can be taken from German patent application P 10010042.2, filed on the same date (applicant: Continental Teves AG & Co. oHG, title 'Method and circuit arrangement for the activation of deactivated circuit modules and use thereof', serial number not yet known).

Favorably, only one channel is equipped with elements for waking another channel or further channels according to the present invention.

In a preferred aspect of the system, a monitoring circuit is arranged particularly on the receiving device, said monitoring circuit monitoring some selected system functions and initiating an emergency operation or a disconnection of the system in dependence on the result.

Preferably, the output stages of the position transmitter and the input stages of the receiving device are designed ratiometrically with regard to a common current/voltage supply.

The term 'ratiometrical' implies in the sense of this invention that the voltage level is adapted to the level of the voltage supply at the output of a channel of the power driver stage in the position transmitter. This changes the output voltage or, respectively, the output level of the channel to a variation of the supply voltage in the same ratio (linearly).

In the receiving device the input stages of the channels are also configured so that they perform in the same ratio as the supply voltage with respect to their sensitivity. This permits preventing in the operation of position transmitter and receiving device with the same voltage supply that level variations of the signal caused by different voltage levels will have an erroneous interpretation in the comparator of the receiving circuit as a result. Of course, the ratiometry described hereinabove can only be kept within an appropriate supply voltage range.

A preferred aspect of the system arranges for the functional groups provided in the channels of the position transmitter to be fed by respectively one current/voltage supply line fed by the receiving device.

The present invention relates also to a position transmitter for sending position signals by way of one or more channels.

Favorably, the signals are produced in the electronics of the position transmitter by including a current supply. Thus, the position transmitter is an active position transmitter.

The displaceable magnetic encoder (1) provided in the position transmitter advantageously includes magnetic zones of equal length along the direction of displacement.

The magnetic transformers for sensing the magnetic field (e.g. AME—Anisotropic Magnetoresistive Effect—bridge circuits) convert the magnetic field information into an electric signal. It is expedient for redundancy reasons to provide for a number of sensor subassemblies comprised of magnetic converter and signal-conditioning circuit. Advantageously, exactly one magnetic transformer is provided in each sensor subassembly, and if said transformer operates according to the AME principle, the transformer e.g. comprises two or more bridge circuits. In the sensor subassembly the electronic signal-conditioning circuit is integrated at least in part in one joint housing with the transformer element. It is preferred, however, that the entire signal-conditioning circuit is integrated in the sensor subassembly.

In another favorable embodiment, the magnetic transformers of all channels and the associated conditioning circuits are integrated in a sensor subassembly. It is especially preferred that the conditioning circuits are integrated on one joint chip.

The signals generated by means of the position transmitter of the invention are advantageously pulse-coded. Different types of pulses may be provided. In a particularly favorable manner, the amplitude and the pulse width is defined in each type of pulse. Preferably, the pulse types differ in their amplitude. An additional signal line for transmitting a motion direction signal may be economized by using two pulse types.

A pulse for the signal-conditioning circuit is favorably produced when the position of the control element has changed by the width of a zone of the encoder. The result is a smaller pulse distance at an increasing rate of motion of the control element.

The present invention also relates to a receiving device for receiving a position signal transmitted via one or more electric lines, especially of signals of a position transmitter.

Advantageously, counters for counting signal pulses that can be transmitted by way of the line are provided in the processing channels of the receiving device, with each channel being equipped with accurately one counter in particular.

Preferably, there is provision of at least one pulse-distinguishing device connected to the counters so that the counters are counted upwards respectively downwards when pulses of a first type are received, and the counters are counted downwards respectively upwards when pulses of a second type are received.

In a preferred aspect of the receiving device, there is provided a suppressing device for suppressing spurious signals in one or preferably all channels introduced via the signal input(s). Suitably, the suppressing device comprises a current driver on the part of the transmitter or receiver, said current driver impressing a current of constant flow onto the signal line of the respective channel. This current is discharged again by means of an appropriate low-ohmic line end in the receiving device (or, alternatively, on the transmitter side). A current drain is favorably inserted into the circuit of the receiver for discharging the current. Further, a signal filter for each channel is advantageously provided in the receiver, said signal filter allowing spurious signals to be filtered out of the data signal. Preferably, the signal filter is a digital filter.

Principally each channel in the receiving device can be equipped with a current/voltage supply of its own. However, the present invention prefers the voltage supplies of the individual channels in the receiving circuit to be comprised in one separate area and to be independent of the channels. It is favorable that the voltage supply includes cells that are independent of one another and can be activated channel by channel.

Information about the position of the position transmitter is memorized in each channel in the receiving circuit of the present invention. Different pieces of position information may e.g. develop due to interference pulses, which have been identified erroneously as valid increment pulses. Once the individual pieces of position information differ from each other, an error prevails. Such an error condition which is due to different counter counts can be detected by a circuit of the control device (e.g. ASIC or discrete circuit) or by a suitable diagnosis routine (e.g. implemented in a microcomputer comparing the channels in consideration of different resolutions, as the case may be).

To eliminate these errors, a recalibration device is arranged for in another favorable embodiment of the receiving circuit, said recalibration device enabling to adapt the stored position information if a different position is detected in the channels. This is possible, for example, by resetting all counters to a new, joint value (reset or start value).

Preferably, pulses counted incorrectly in the recalibration device are eliminated with each zero point transition (full relief of the brake pedal). This is possible because the control element, usually in the non-actuated condition, returns into a more or less precisely defined initial position. This rules out a negative position.

It is also feasible to carry out a calibration of errors in the direction of the maximum actuation of the control element. This action necessitates an additional absolute position signal transmitter.

In a particularly favorable manner, an intelligent recalibration method is configured in the microcomputer of the receiving circuit, in which method the time variation of the pedal position, especially the current driving situation of the vehicle as whole, is evaluated. For example, it may be evaluated whether a constant position of the brake pedal prevails for a determined period of time so that it may be assumed that the brake is not applied. A poll can be made in addition whether the acceleration pedal in the motor vehicle has been applied, which also indicates a non-use of the brake pedal.

Eventually, the present invention relates to the use of the system of the invention as described above in a motor vehicle brake system, wherein the position signals of a brake pedal are transmitted to a brake control device (e.g. electrohydraulic brake or electro-mechanical brake) mainly by means of electric signals.

Further favorable embodiments of the present invention can be seen in the following description of the Figures and the sub claims.

DETAILED DESCRIPTION OF THE PREFERRED EMBODIMENTS

Figure 1:
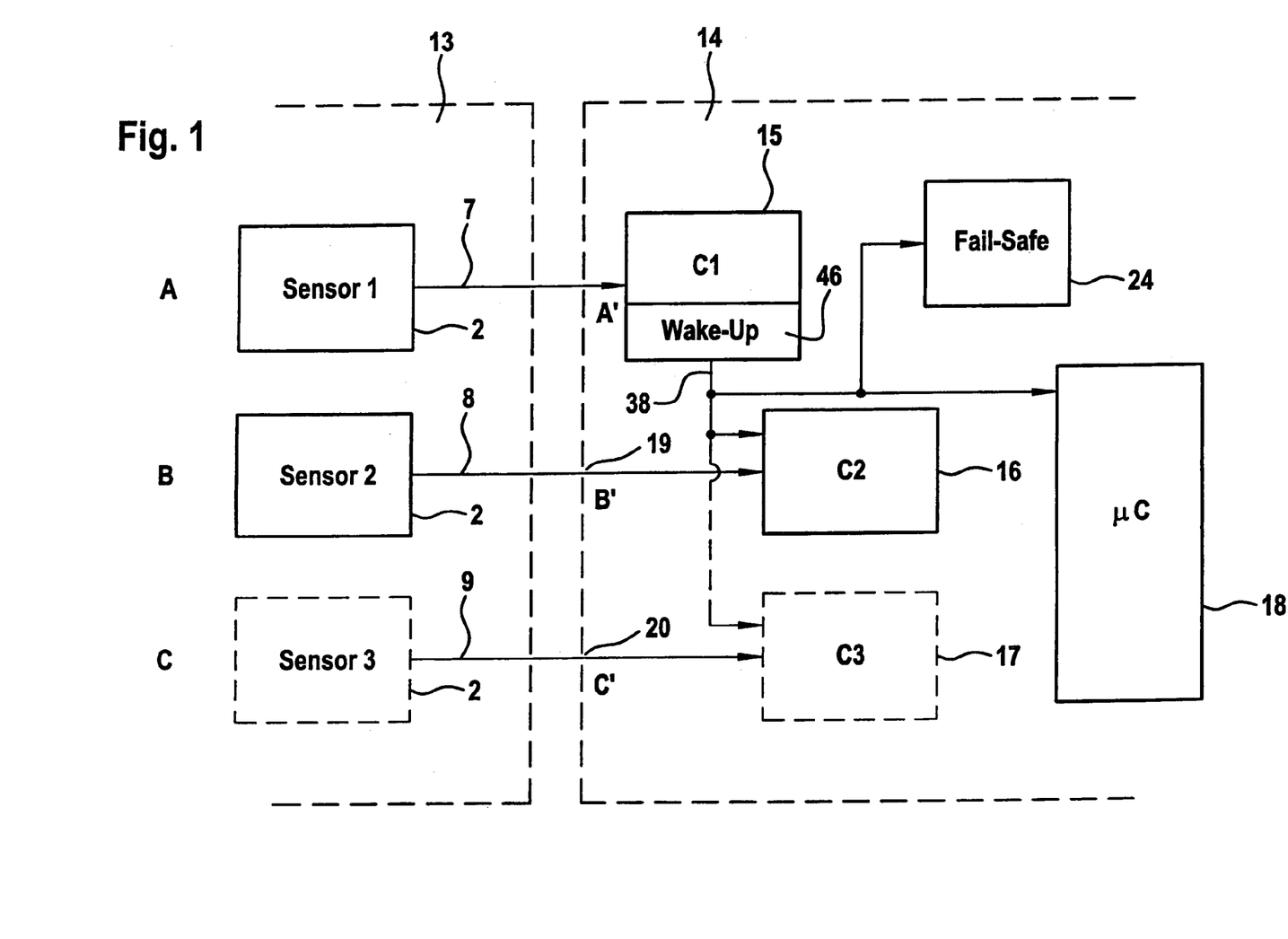
FIG. 1 is a schematic view of the system of the present invention.

The basic function blocks of the system according to the present invention are described by way of FIG. 1.

Figure 3:
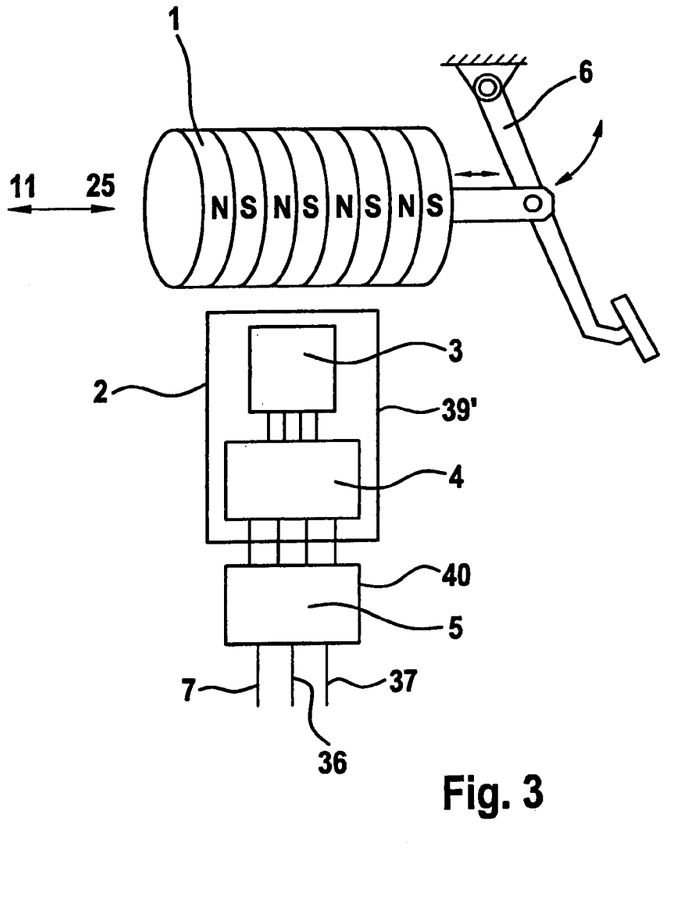
FIG. 3 is a diagrammatic depiction of a second embodiment of a position transmitter of the present invention.
Figure 4:
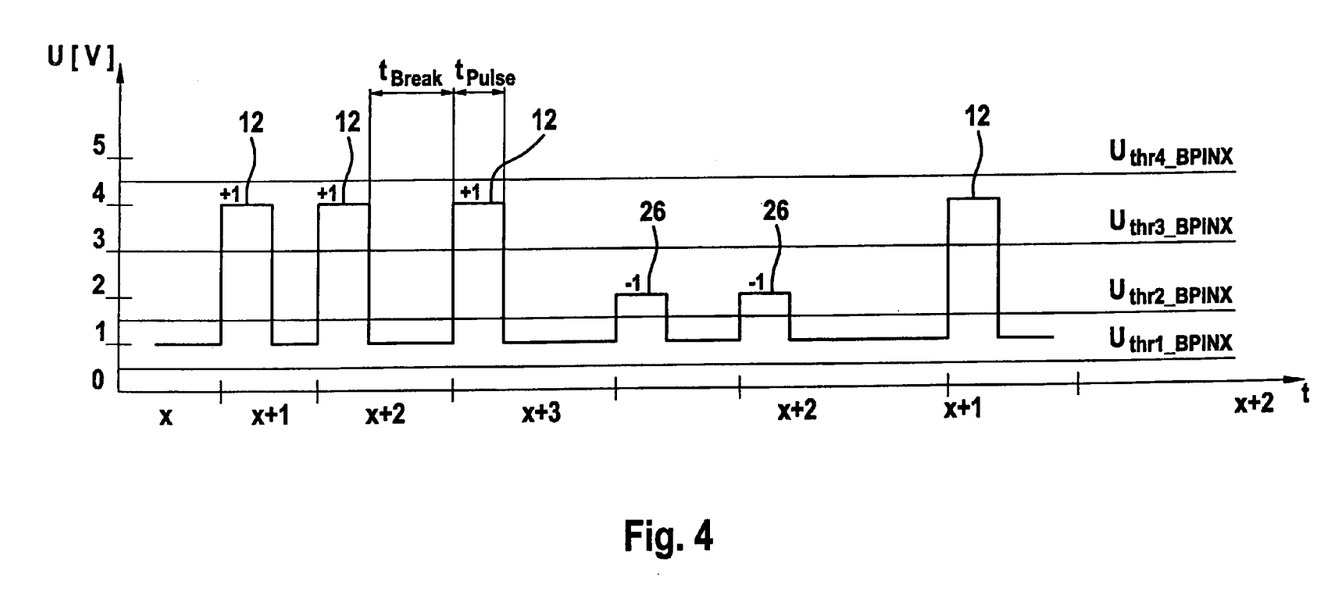
FIG. 4 is a graphical depiction of a transmission protocol for transmitting the position signal from a position transmitter to a receiving device.

As many as three signal channels A, B, C (which are basically completely independent of one another and have one signal line 7, 8, 9 each) are employed to transmit the position signals from the position transmitters for brake pedal sensors illustrated in FIGS. 3 and 4. Channel A' in the receiving circuit 14 which is associated with sensor channel A is designed for the operation with a comparatively low power consumption and is in permanent operation. In the sleep condition the other channels are deactivated, meaning that their voltage supply is disabled. When a valid signal for wake-up is detected in channel A', the wake-up device 46 will activate the other channels B' and C' by way of line 38, as well as the microcomputer 18 and a monitoring circuit (fail-safe logic) which executes defined error-monitoring measures such as monitoring the counts of the position counters with regard to a maximum deviation as well as monitoring overvoltages and undervoltages.

Figure 2:
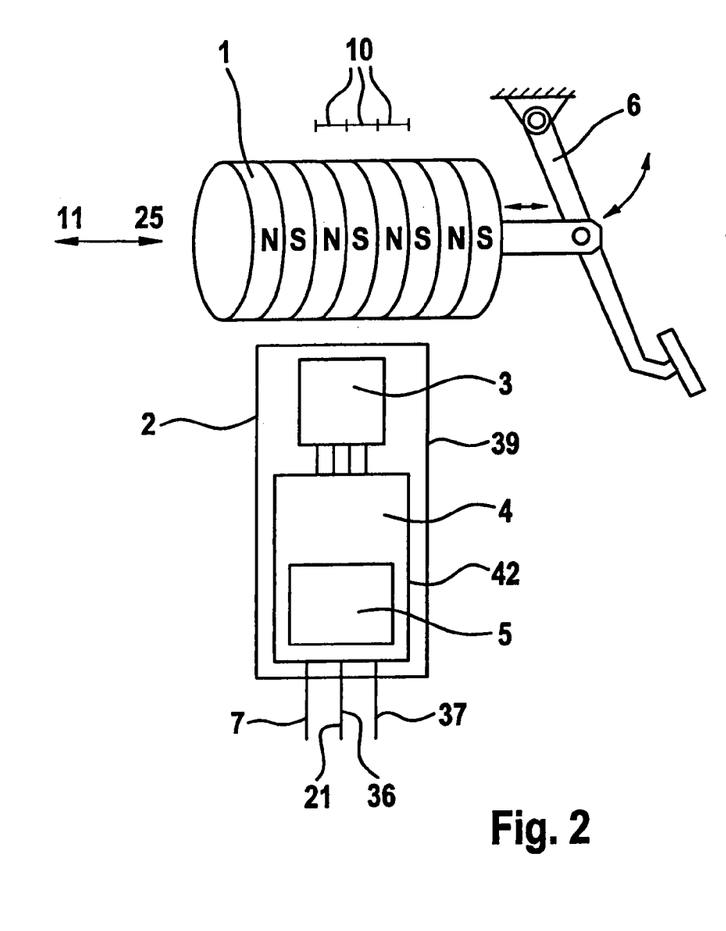
FIG. 2 is a diagrammatic depiction of a first embodiment of a position transmitter of the invention.

Three independent sensor assemblies 2 determine the distance covered by the brake pedal. Each sensor assembly independently generates pulses in dependence on defined steps of a jointly scanned encoder 1 (FIGS. 2 and 3). Depending on the moving direction of the pedal 6, square-wave pulses which can be distinguished in terms of their moving direction, are transmitted by way of lines 7, 8, 9.

The pulses are decoded channel by channel on chip 14 and transmitted to counters 15, 16, 17 counting upwards or downwards in dependence on the moving direction. The counters then store the respectively current position of the brake pedal and keep this information at disposal for further processing by microcomputers 18.

It is preferred that the components of the receiving devices are integrated on one joint chip 14.

A reduced current consumption of channel A' may be achieved by providing the respective channel with a lower position resolution. Counter 15 will then count more coarse position variations than the other counters 16 and 17.

The principle of producing the position signals is illustrated schematically in FIG. 2. By means of a brake pedal 6, a magnetic encoder 1 is moved in relation to the sensor subassembly 2 by way of a push rod.

The transformer 3, which is arranged in the sensor assembly for transforming the magnetic signal into an electric signal, may e.g. operate according to the AME principle, the GMR principle (GMR=Giant Magneto-Resistive effect), or the Hall principle. The sensor assemblies 2 are arranged in relation to the encoder so that opposed to each sensor module is either a different sequence of periodically alternating magnetizations of different encoders, or all sensor modules scan the same sequence of periodically alternating magnetizations of one joint encoder. A permanent-magnetic encoder of a tubular design is favorably used according to the present invention. The sequence of alternating magnetizations is produced by zones 10 (north poles/south poles) magnetized in alternating directions and extending as equidistant ring zones 10 along the tubular periphery. One example for a mechanic device, which is preferably used according to the present invention for detecting the pedal travel with one or more encoders and magnetic transformers, is described in German patent application P 10010042.2 (assigned to Continental Teves). Depending on the extent of the evaluation of using the courses of magnetic field lines generated by the encoder, travel sensors may be fabricated in a per se known fashion, which produce an output signal with a different position resolution in each case from the magnetic field signal by means of an evaluation electronics.

The transformer elements 3 favorably concern sensor elements on the basis of AME bridges with especially two bridge circuits in one transformer. The transformers 3 are connected to a signal conditioning circuit 4 by way of four lines. The interpolator unit 4 produces two square-wave signals shifted by an angle of 90° and relayed to the functional unit 5. The signal conditioning circuit is an appropriate integrated analog signal sequence circuit with an interpolation network which, depending on the moving direction, makes the motion information available by way of two separate lines. The electronic functional unit 5 produces from the square wave signals of the interpolator unit 4 an incremental signal pulse sequence respectively associated with the position increments, the special characteristics being that the two moving directions are characterized by using two different signal amplitudes. The sensor subassemblies 2 transmit the information about the moving direction as a component of the signal of the position increments by way of line 7, with reference numerals 36 and 21 designating connections for the supply voltage and 37 being provided for ground connection. The integrated circuits 4, 5 and the transformer 3 are grouped in one common housing 39.

In contrast to FIG. 2 where the sensor subassembly 2 is so designed that the transformer 3 is combined with the electronic signal-conditioning circuit made up of interpolator unit 4 and functional unit 5 to form a joint integrated circuit 42, the transformer 3 and the interpolator unit 4 are accommodated in one joint housing 39' in the example of FIG. 3. The functional unit 5 is designed separately of the arrangement in housing 39'.

The result of the separate arrangement of functional unit 5 are cost advantages because the unit grouped in housing 39' allows being used in the same design as wheel speed sensors for electronic brake systems.

FIG. 4 depicts an example for a signal with a transmitting protocol for transmitting the position signal from a position transmitter to a receiving device. The movement of the encoder to a first direction 11 (FIG. 2) causes the generation of square-wave pulses 12 with an amplitude of 4 volt. Each pulse corresponds to a movement of the encoder 1 by a zone 10. In a movement to the second direction 25, square-wave pulses with a 2 volt amplitude are generated. To detect sensor errors and line defects (e.g. cable break), an offset voltage of $U_{offset}=1$ volt, which can be produced by means of an offset device provided in the circuit, is applied between the pulses. The susceptibility to errors in the signal transmission can be reduced by a definition of the interface with comparatively high signal levels in the range of a voltage of 1 to 4 volt.

It is suitable to determine the width of the generated pulses by the circuit to be constant in that fashion that the maximum possible pedal travel speed, which is limited to the top by the mechanic inertia of the position transmitter device, can still be reliably transmitted. Suitably, the pulse width is chosen such that the ratio of pulse width to pulse-pause width (duty cycle) at a maximum possible pedal speed amounts to roughly 50%.

Figure 5:
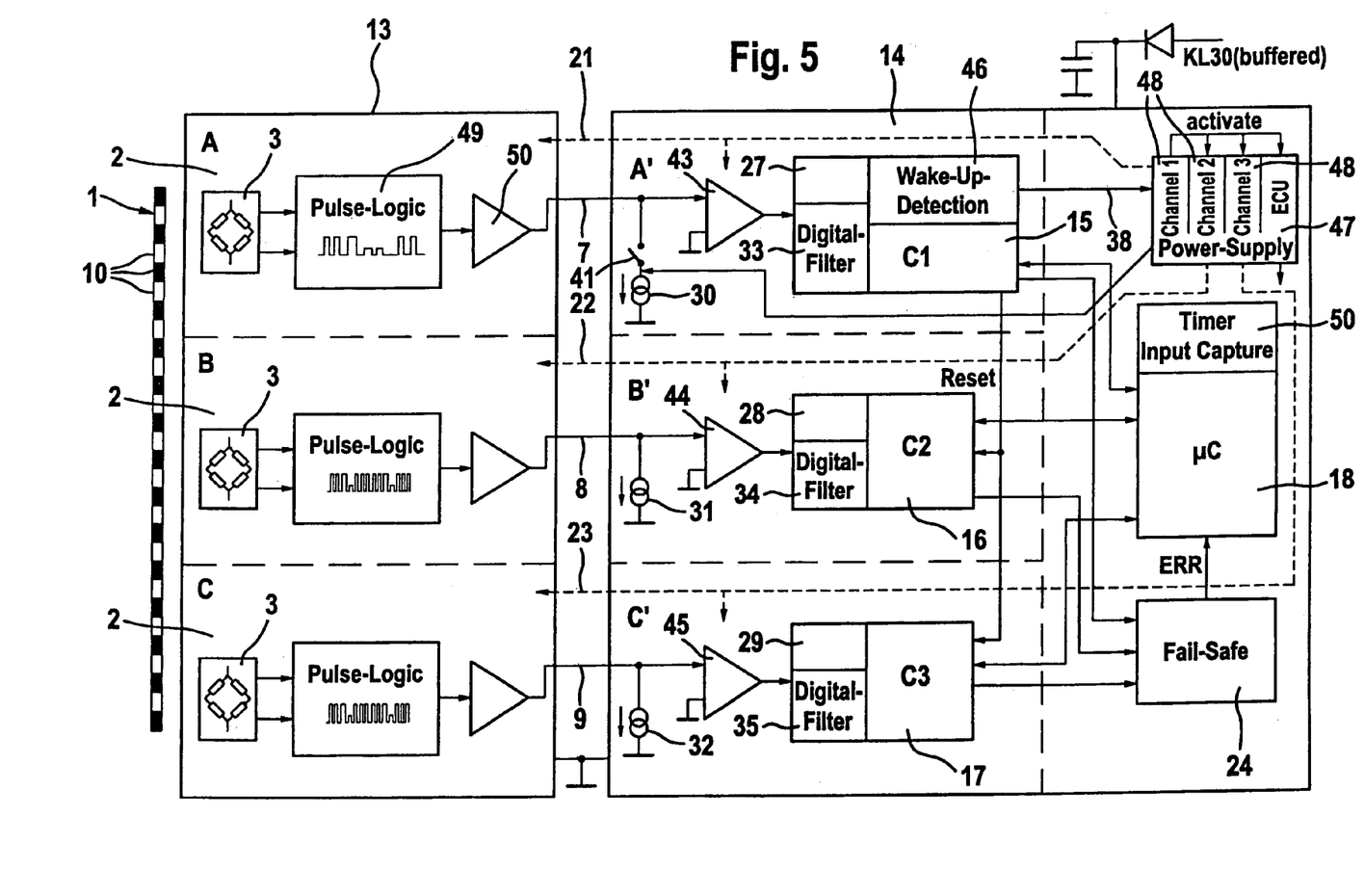
FIG. 5 is a schematic of an integrated circuit for a position transmitter and an integrated circuit for a receiving device.

FIG. 5 illustrates the block diagram of an integrated circuit 13 of a position transmitter and an integrated circuit 14 for receiving the signals of the position transmitter. It is suitable that the receiving circuit 14 is integrated in a chip of an electronic brake control device.

The position transmitter 13 comprises for each channel a transformer element 3 with a magneto-resistive bridge circuit, increment generation logic 49 as well as a power driver stage 50.

The pulses of the position transmitter are relayed to the receiving circuit 14 in parallel in the channels A, B, and C by way of lines 7, 8, and 9. The current supply of the position transmitter is carried out by the receiving device, preferably in a way separated for each channel by way of a current supply line 21, 22, and 23 associated with the respective channel. Channel A of the position transmitter is so configured that the pulses produced in this channel are generated with a position resolution that is definitely reduced compared to the channels B and C. An output of the signal conditioning circuit in the sensor subassembly, which is provided especially for this purpose, may be used with a defined lower resolution, which is preferred according to the present invention. Suitable travel sensors with a different resolution are described in the above-mentioned German patent application P 10010042.2 (assigned to Continental Teves).

Channel A of the position transmitter is active both in the sleeping and the activated operating condition of the system. Channels B and C are switched on in the event of activation by channel A by way of the current supply 47 of the receiving circuit.

In the channels of the receiving circuit, the signals are sent on the input side in each case to a comparator stage 27, 28, 29 for distinguishing the signal levels.

An offset current with power drivers 50 and current drains 30, 31, 32 is impressed on the signal lines, possibly jointly with an offset voltage, by means of an offset device for the interference suppression, and the current drain in channel A' can be disabled in the sleep mode by way of switch 41.

In the sleep mode, especially when the ignition was not started and there is no brake pedal application, channel A' of the receiving circuit is restrictedly active. Further channels B' and C' are deactivated by way of switching off the current supply. The deactivation or activation of the channels B and C of the position transmitter is performed by way of the current supply lines 22 and 23.

The number of the pulses detected by way of the line are counted with the counter 15, 16 and 17 arranged at the output of the digital filters 33, 34 and 35, with the said counters counting either upwards or downwards depending on the signal type 'forward' (pulse shape 12) or 'backward' (pulse shape 26).

To detect errors during data transmission, an error detection circuit 24 is arranged in the receiving circuit and connected to counters 15, 16, 17 and microcomputer 18. Error monitoring may favorably be carried out in that the counter counts are monitored with respect to a defined, maximum allowable difference of e.g. some bits. In an embodiment with three or more channels, the channel with a count that differs from the other channels may be excluded from the position determination. When at least two high-resolution channels are provided, at least one high-resolution channel will advantageously remain available in the case of an error of this type—under the condition that the error is not a rare double error.

The error detection circuit is preferably equipped with an undervoltage and overvoltage detection in addition. This allows detecting defects such as cable break, defective driver stage in the sensor, etc. which may cause undervoltage, as well as errors such as shortcircuits in relation to the battery or the supply voltage etc., which can lead to overvoltage.

To reduce the sensitivity with regard to signal disturbances, the reference potential in each channel is led to the receiving circuit in parallel to the signal lines by way of an additional line (not shown). Since disturbances coupled in this case basically split evenly among the lines for the reference potential and the signal (common-mode interferences), the disturbances may be filtered out in the input stage of the receiving circuit by means of a differential input stage 43, 44, 45 provided for each channel.

The input comparator 27, the digital filter 33, the counter 15, and the wake-up device 46 is enabled in the sleep mode. For change-over of the input circuit from the sleep mode into the fully activated operating mode (wake-up) where especially the current source of the wake-up channel, the error detection circuit 24 and the microcomputer 18 are switched on, the input signal is monitored by the wake-up device 46 with respect to a signal pulse in channel A. To this end, channel A is connected to the current supply 47 in both operating conditions. Low power consumption is achieved by a lower clock frequency of the digital input filter 33.

However, it is also possible to design the circuit so that the digital filter is disabled in the sleep mode. This is to be preferred for reasons of simplicity in the event that the enable delay of the digital filter is so short that the time remaining for detecting a just received signal pulse, during which the digital filter works, is sufficient to make a distinction between a pulse and a spurious signal. It is especially favorable for this embodiment when the two-step wake-up circuit is employed, as has been described in the above.

In the first-mentioned embodiment with a frequency change-over of the digital filter, the result of the lower clock frequency in the sleep mode is a remarkably reduced position resolution. The latter is, however, still sufficient to detect an event. Due to the higher clock frequency of the digital filters 34 and 35, the further channel(s) B' and C' have a higher position resolution, but the filters are active only in the activated operating mode. When the wake-up device 46 detects a signal that is allowable for wake-up, the high-resolution channels are activated by means of enabling the current source channels 48 in the current supply 47 that are provided for the above channels. In addition to the activation of channels B' and C' the current source of channel A' is switched on. In a particularly favorable manner, the wake-up device additionally activates the control device for the brake system.

The receiving circuit further comprises a switch module connected to the counters 15, 16, and 17 and used to determine the pedal acceleration in real time (timer-input-capture) that can be read out from the microcomputer 18.

A valid wake-up signal which caused the wake-up device to activate the channels B' and C' can no longer be processed entirely in channels B' and C' due to the time needed for the activation action. The result is an unsharpness in the counters of channels B' and C' with regard to the output position of the brake pedal. However, this unsharpness is not greater than the position resolution of the pulse detection in channel A, A'.

The system with only two channels as described herein is an embodiment that is less costly compared to the system with three channels illustrated in FIG. 5. In the two-channel system a first channel is designed as a low-resolution channel with wake-up device, and a second channel is a high-resolution channel that is disabled in the sleep mode and can be waked up by the first channel. Error monitoring is also possible in the two-channel system, however, when comparing the position counter counts, said monitoring is limited to the bits existing in the low-resolution counter in the first channel. Accordingly, an error is detected later than in a system with three or more channels. When a difference of the counter counts occurs in the two-channel system described herein, the brake system is switched over to the hydraulic emergency brake operation, if the brake is an electro-hydraulic brake. It is also possible, for example when the system is employed in brake systems without hydraulic emergency brake operation, to maintain an emergency operation without redundancy with only one sensor. A corresponding emergency operation is also possible with a low-resolution channel of fail-free operation, however, a request for brake effect is then possible only in comparatively coarse stages.

Figure 6:
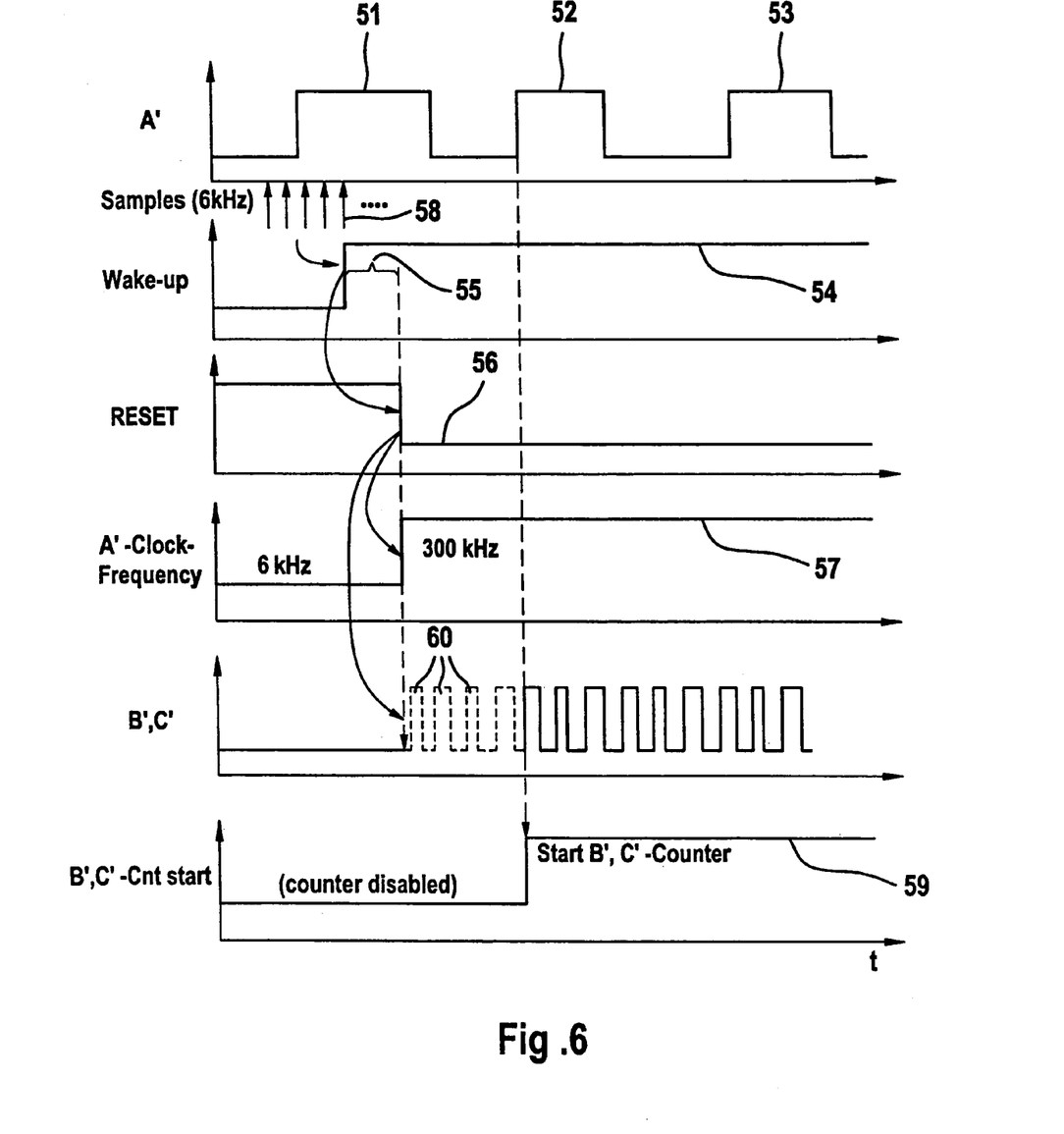
FIG. 6 is a graphical depiction of the time-response of signals during the change of the system from a rest condition with low current consumption to a wakened system condition with a higher current consumption.

FIG. 6 shows the time sequence of the signals in the receiving circuit of FIG. 5 being produced after a valid wake-up pulse 51 is received in channel A'. Further pulses 52 and 53 follow on the signal line of channel A' upon continued movement of the pedal travel generator. The counter 15 (FIG. 5) associated with channel A' is permanently enabled so that it represents the current position of the brake pedal in the lower position resolution. After a wake-up pulse in channel A or an external wake-up signal, the receiving circuit is passed over from the sleep mode into the active mode by way of setting the wake-up signal 54 'high'. Signal 54 activates the voltage supply on the receiving circuit and that of the control device. After three consecutive scanning cycles 58 in the digital filter 33 (FIG. 5) the pulse 51 is identified as valid wake-up signal. As soon as the voltage supply is ready after a time period 55, the RESET signal 56 is set from 'high' to 'low'. The clock of the sampling in filter 33 is increased from 6 kHz to 300 kHz by means of this signal. The increase in frequency is indicated by means of signal 57 by a transition to 'high'. The pulses 60 in channels B' and C' are narrower because these channels have a higher resolution than channel A'. Subsequently, the value from counter 15 is input by channel A' into the corresponding higher-value bits (MSBs) of counters 16, 17 in channels B' and C'. After the transmission of the counts, the counters 16, 17 are not allowed to start immediate counting because the brake pedal, due to the filter time, has adopted a position between two local marks of the counter 13, said position being indefinite for reasons of resolution. Due to the fact that the position of the brake pedal is exactly defined only at the point of time when a pulse edge of counter 15 prevails, counters 16 and 17 will only be started as soon as a RESET edge to signal 55 has occurred and an edge of a pulse 52 following wake-up pulse 51 is recorded in channel A'.

As has been explained in the above, the lower clock of the filter in channel A' in the sleep mode causes a reduced current consumption. Detection of a wake-up pulse is possible with the low clock because the pulses and pause times of the signals produced by the position transmitter in channel A are longer that those in channels B' and C'. During operation with the receiver device fully activated, however, the clock of the sampling frequency in channel A' must be raised to the clock of channels B' and C' so that no differences in transit time occur when triggering the counters which would lead to different counts.

The invention claimed is:

1. A position transmitting system, comprising:
    a moveable control element having magnetic zones along a direction of displacement;
    one or more magnetic transformer; and
    an electronic signal-conditioning circuit arranged in an electronic sensor subassembly, wherein the electronic signal-conditioning circuit is at least partially integrated with the one or more magnetic transformer, and the signal-conditioning circuit includes one or more electric signal lines that are coded with time-varying signals, the time-varying signals are coded in dependence on a position of the control element.

2. A position transmitting system according to claim 1, wherein the time-varying signals are pulse-coded.

3. A position transmitting system according to claim 2, wherein the pulse coded signals are generated when the position of the control element has changed corresponding to a width of a zone of an encoder.

4. A position transmitting system according to claim 3, wherein pulses of a first type are transmitted when the control element moves in a first direction, and pulses of a second type are transmitted when the transmitter moves in a second direction, wherein the pulses of the first and second type differ by their pulse shape.

5. A position transmitting system according to claim 2, further including a receiving device for receiving a position signal transmitted via said one or more electric signal lines, wherein the receiving device includes one processing channel for each respectively associated electric signal line.

6. A position transmitting system according to claim 5, further including one or more counter for counting pulse-coded signals transmitted by way of the electric signal lines is provided in the processing channels.

7. A position transmitting system according to claim 6, wherein each channel includes at least one pulse-distinguishing device connected to the counters wherein the counters count upwards when pulses of a first type are received, and the counters count downwards when pulses of a second type are received.

8. A position transmitting system, comprising:
   a moveable control element having magnetic zones along a direction of displacement;
   one or more magnetic transformer;
   an electronic signal-conditioning circuit arranged in an electronic sensor subassembly, wherein the electronic signal-conditioning circuit is at least partially integrated with the one or more magnetic transformer, and the signal-conditioning circuit includes one or more electric signal lines that are coded with time-varying signals, the time-varying signals are coded in dependence on a position of the control element; and
   a two-stage wake-up circuit coupled to at least one of the electric signal lines, wherein the two-stage wake-up circuit awakens into a first stage on a preliminary basis wherein a first stage includes a preliminary evaluation of the input signal with respect to detecting an input signal valid for wake-up, wherein a second stage is enabled when the first stage has detected a valid pulse, wherein the second stage includes performing a final check with respect to a valid wake-up pulse.

* * * * *